3,231,439
DIMENSIONAL STABILIZATION OF
FOAM PANELS
Walter D. Voelker, Philadelphia, Pa., assignor, by mesne assignments, to Allied Chemical Corporation, New York, N.Y., a corporation of New York
Filed Nov. 27, 1962, Ser. No. 240,304
1 Claim. (Cl. 156—79)

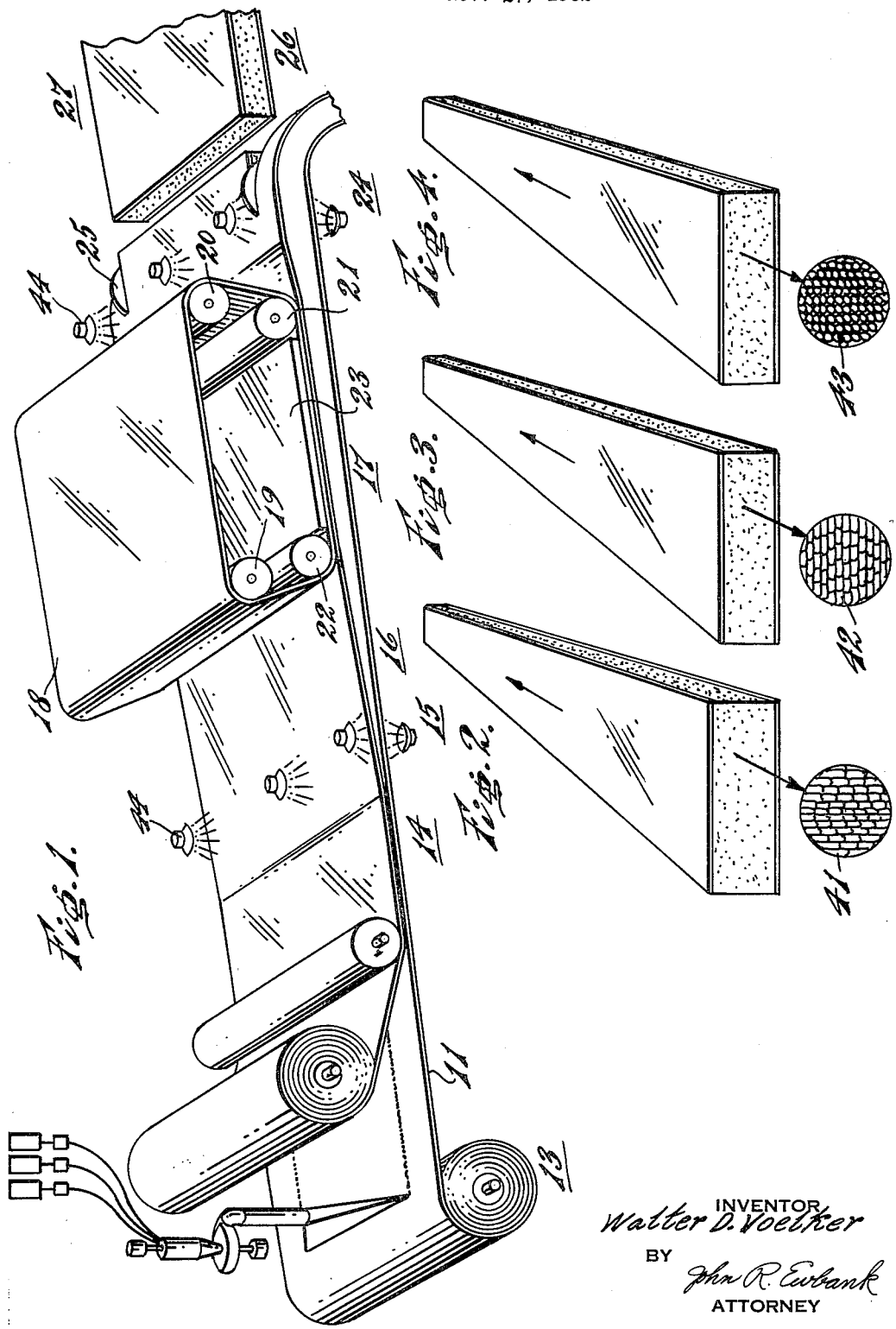

This invention relates to the preparation of rigid polyurethane foam sandwich panels and particularly to the preparation of sandwich panels which have an improved degree of dimensional stability.

In the previous manufacture of rigid polyurethane foam panels difficulties have been encountered by reason of the tendency of the rigid sandwich panel to change dimension during storage and/or use. Various theories have been proposed to explain the tendency of the panel to shrink in thickness and/or increase in the linear dimensions with the passage of time. In the development of the present invention, the important discovery was made that the cells of a freshly prepared rigid polyurethane foam panel tend to be of an ellipsoidal or tear-drop shape with the major axis of the cell perpendicular to the sheet and that subsequently with passage of time the cells tend to become more nearly spherical and, in becoming more spherical, impart a change in the thickness, length and/or width of the rigid polyurethane foam panel.

In accordance with the present invention a dimensionally stable panel is prepared by a method in which a film of uncured polyurethane foam forming material is positioned between two facing sheet materials, and after the foam has developed partially, the precursor is advanced to a dimensional stabilization zone prior to the development of the maximum thickness of the polyurethane foam core of the rigid sandwich panel and prior to the curing of the polyurethane foam. In the dimensional stabilization zone the core is subjected to a reduction in thickness so that the partially foamed precursor is reduced in thickness by at least 5% of the thickness thereof but less than 40% of the thickness of the core and the thus compressed strip is advanced to a final curing and heat stabilization zone.

The invention is further clarified by the accompanying drawings in which FIG. 1 is a schematic showing of a method of the present invention. FIGS. 2 and 3 schematically show the precursor just prior to entering and just after leaving the dimensional stabilization zone. FIG. 4 schematically shows the finally cured sandwich panel of the present invention.

By way of introduction, it may be noted that a stable panel is produced by a method in which a strip of rigid polyurethane foam sandwich precursor advances through a plurality of zones including a dimentional stabilization zone. The strip of precursor which develops into the polyurethane foam panel passes through zones which can be designated as a coating zone, a creaming zone, a rising zone and gel strength development zone prior to reaching the dimensional stabilization zone. The precursor has sufficient strength to withstand some compression but does not have a high proportion of its ultimate crushing strength. The compression applied to the intermediate product is sufficient to reduce the thickness of the precursor by at least 5% but less than 40% of the thickness of the precursor and such reduction in thickness is accomplished by a compressive force which is less than 10 lbs. per sq. inch. Thus it is feasible to transform some of the cells in the polyurethane foam core from a shape such as a tear-drop or ellipsoid with major axis perpendicular to the facing sheets and to transform a high proportion of the cells into the shape of slightly flattened spheroids having their major axes generally parallel to the sheet. The precursor is retained in this condition while gelation and curing progress until the sandwich can be cut and handled. Any further expansion of the polyurethane foam precursor tends to bring about an increase in the diameter of the thus established spheres instead of stretching the composition to form the elliptical cells. During the normal expansion and forming of a rigid polyurethane foam composition the expansion of the gas within the rising polyurethane foam tends to increase the height of the cell relative to its width and the present invention overcomes the disadvantages of such phenomena by transforming a significant portion of the cells from such ellipsoidal shaped cells to generally spherical cells.

Subsequent to the compression of the precursor to bring about the transformation of the cell from a vertically aligned ellipse to a more nearly spherical or horizontally aligned ellipse, the cell size may be modified autogenically by the further expansion of the composition so that, as the product enters the curing zone for final chemical reaction, the cells are of a generally spherical shape. By reason of the spherical shape of a significant portion of the pores, the cured rigid panel retains its initial dimensions during long periods of storage and/or use.

In FIG. 1 a slab production line for rigid polyurethane foam includes means whereby a lower facing sheet 11, and an upper facing sheet 12 each advance at the same speed. The facing sheets advance through zones comprising a deposition zone 13, creaming zone 14, rising zone 15 and gel strength development zone 16. The formulation for the rigid polyurethane foam may be any standard formulation for an insulation panel such as follows:

| | Parts by weight |
|---|---|
| Technical grade of nonapropoxysorbitol, such as tris (tripropyleneether) sorbitol, or other propylene oxide adduct of sorbitol having a molecular weight of the general magnitude of 722, or conveniently designated as propsorb 700 | 100 |
| Polyphenylenepolyisocyanate | 125 |
| Triethylenediamine catalyst | 0.5 |
| Dibutyltindilaurate catalyst | 0.1 |
| Silicone surfactant | 1.5 |
| Trichlorofluoromethane | 29 |

As a specific example illustrative of one embodiment, the initial coating of the polyurethane foam forming composition is approximately 1 mm. and is designed to expand approximately 30 fold to provide a polyurethane foam core 3 cm. thick. The sandwich precursor advances at the rate of about 50 centimeters per second and is heated at a temperature of about 60° C. in the creaming and rising and gel-strength development zones 14, 15, and 16 respectively.

Particular attention is directed to a dimensional stabilization zone 17 comprising a belt 18 driven about 4 rollers 19, 20, 21, and 22, and a pressure plate 23. In the dimensional stabilization zone the foam core of the precursor is reduced in thickness from 3.2 cm. to about 2.8 cm.: (12.5% reduction) and thereafter the foam core of the precursor expands to its intended thickness of about 3 cm. The precursor leaving the dimensional stabilization zone 17 advances to a curing zone 24 in which the temperature of the rigidizing foam is maintained hot enough to bring about the substantially exhaustive reaction among the isocyanato groups and the hydroxyl groups. The slab advances from the curing zone 24 as a rigid sandwich slab having a polyurethane foam core. The slab is trimmed by cut-off saws 25 and is cut into panels in a product withdrawal zone 26. The resulting panel 27 is characterized by substantially spherical cells and a high degree of dimensional stability so that it may be stored for long periods of time and/or utilized in the various applications as an insulation panel without troublesome aging of a nature that would significantly alter its dimensions.

As shown schematically in FIG. 2 the precursor prior to entering the dimensional stabilization zone 17 has cells 41 which tend to be of a tear-drop and/or ellipsoidal shape by reason of the upward movement of the foam. The expansion of the foam forming composition is approximately 30 fold by volume but substantially all of this expansion occurs in a single dimension, that is, upwardly because the nucleii for the cell have relatively little opportunity to expand either forwardly, rearwardly or sidewardly, but encounter substantially no resistance except normal atmospheric air pressure for an upward rise. The rate of growth of a cell from its initial microscopic size until the stabilization zone 17 is faster in the vertical dimension, thereby forming a cell having a somewhat ellipsoidal and/or tear-drop shape, the long dimension being vertical.

As shown in FIG. 3 the compressive force imposed upon the precursor while it still retains significant elasticity and compressability in the stabilization zone 17 brings about a change in the shape of the cells. Some of the cells may thus transform into cells of a substantially spherical shape. Some of the cells are transformed to ellipsoidals having a horizontally disposed major dimension as indicated by cell 42 of FIG. 3. It should be especially noted that the compression of the precursors for purposes of dimensional stabilization must be accomplished prior to the development of extreme rigidity in the precursor and it has been established that it should not be necessary to employ a force greater than 10 lbs. per sq. inch to bring about the compression and to generally spheroidize the cells. If a force greater than 10 pounds per square inch is necessary for compressing the precursor sufficiently to spheroidize a major proportion of the ellipsoidal shaped pores, then the precursor has developed too great a degree of rigidity and three dimensional structure and the advantageous results of the present invention are unattainable.

As shown schematically in FIG. 4 the sandwich panel 27, subsequent to curing zone 24 and withdrawal zone 26, tends to have a very high proportion of substantially spherical cells 43 notwithstanding the existence of a random distribution of a few pores having tear-drop and/or ellipsoidal shapes which are oriented vertically, horizontally and at diverse angles. To the extent that the precursor developes semi-rigid properties, the elastic memory of the precursor will tend to restore the precursor to a thickness existing prior to the dimensional stabilization step, but ordinarily such elastic memory phenomena has has no significance in the dimensional stabilization. To the extent that there is a residual evolution of gas within the cells of the precursor in the curing zone 24, there is further expansion and further increase in the thickness of the precursor subsequent to the dimensional compression. Inasmuch as there is a somewhat elevated temperature in the final curing zone 24, there is a tendency for each of the cells to be expanding somewhat, and as the cells at this time are of a spherical shape, the final expansion does not tend to lead to the development of the vertically oriented ellipses. Moreover to the extent that the compression step randomizes the orientation of the ellipses, dimensional stabilization is achieved.

Various modifications of the invention are possible without departing from the scope of the appended claim.

The invention claimed is:

The method of producing a dimensionally stable rigid polyurethane foam sandwich panel which comprises the steps of:

(A) disposing a rigid polyurethane foam-forming mixture between advancing facing sheets, (B) advancing said facing sheets and foam-forming mixture therebetween to foam said mixture and provide an advancing sandwich comprising a partially foamed core having thickness many times that of the initially disposed mixture and generally vertically oriented cell structure in that the cells have vertical axes of greater length than the length of the horizontal axes thereof, (C) subjecting said advancing sandwich before said core is completely foamed and while said foam core is in the malleable state and the cells thereof shapeable to compression to reduce the thickness of said core from 5 to 40 percent; provided that the compressive force to obtain said compression is less than 10 lbs. per square inch applied to a substantial area of said panel, whereby said vertically orientated cells are changed in shape to cells having horizontal axes at least substantially equal in length to the length of vertical axes thereof, (D) releasing said compressive forces and advancing a foam sandwich having thickness greater than the sandwich during compression but reduced over the thickness that would have been obtained had the foam not been compressed, and (E) curing said compressed foam, whereby foam cells originally vertically orientated before compression are transformed to substantially spherical cells and the resulting rigid polyurethane foam sandwich is characterized by lastingly improved dimensional stability against shrinkage in thickness and increase in linear dimensions with the passage of time after completion of the curing of said foam.

References Cited by the Examiner

UNITED STATES PATENTS

| | | | |
|---|---|---|---|
| 2,841,205 | 7/1958 | Bird. | |
| 2,841,515 | 7/1958 | Runton. | |
| 2,950,221 | 8/1960 | Bauer. | |
| 3,046,177 | 7/1962 | Hankins | 156—78 X |
| 3,072,582 | 1/1963 | Frost | 156—78 X |

EARL M. BERGERT, *Primary Examiner.*